United States Patent
Kudo et al.

(10) Patent No.: US 7,586,713 B2
(45) Date of Patent: Sep. 8, 2009

(54) CONTROL APPARATUS, STORAGE APPARATUS, AND HEAD CONTROL METHOD

(75) Inventors: Fumiya Kudo, Kawasaki (JP); Mitsuo Kamimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 170 days.

(21) Appl. No.: 11/496,176

(22) Filed: Jul. 31, 2006

(65) Prior Publication Data

US 2007/0223135 A1 Sep. 27, 2007

(30) Foreign Application Priority Data

Mar. 24, 2006 (JP) ............................. 2006-082870

(51) Int. Cl.
*G11B 5/596* (2006.01)
*G11B 19/04* (2006.01)

(52) U.S. Cl. .................... 360/78.04; 360/60; 360/77.08

(58) Field of Classification Search .................. None
See application file for complete search history.

(56) References Cited

U.S. PATENT DOCUMENTS 6,965,491 B1 * 11/2005 Perlmutter et al. ....... 360/77.04
7,136,245 B2    11/2006 Mori et al.

FOREIGN PATENT DOCUMENTS

| JP | 08-321149 | 12/1995 |
|---|---|---|
| JP | 09-035225 | 2/1997 |
| JP | 2000-36164 | 2/2002 |
| JP | 2005-243160 | 9/2005 |

\* cited by examiner

*Primary Examiner*—Andrew L Sniezek
(74) *Attorney, Agent, or Firm*—Greer, Burns & Crain, Ltd.

(57) ABSTRACT

A control apparatus, storage apparatus and control method uses a correction value for head position written in a recording medium to control head position and prevents a use of a correction value that has improperly been read out. The apparatus comprises: an allowable range acquisition section that acquires a correction value allowable range which is a previously set allowable range of a correction value; and a head position control section that controls head position using a read out correction value in the case where the correction value that has been read out from the recording medium falls within the correction value allowable range acquired by the allowable range acquisition section.

17 Claims, 7 Drawing Sheets

CONTROL APPARATUS, STORAGE APPARATUS, AND HEAD CONTROL METHOD

BACKGROUND OF THE INVENTION

1. Field of the Invention

The present invention relates to a control apparatus, a storage apparatus, and a head control method that detect a read error of servo information (position information) on a storage medium.

2. Description of the Related Art

A servo frame is written between sectors on a general magnetic disk. The servo frame includes servo information such as rough position information in the disk radial direction, detailed position information in the disk radial direction, and a correction value (postcode) of position information in the disk radial direction. A checksum is included in the postcode in order to prevent a read error of the postcode. Only when a checksum that has been read out from a recording medium is determined to be correct, a correction value that has been read out can be used.

For example, as a prior art relating to the present invention, a magnetic disk apparatus and its manufacturing method that correct non-flatness of a position signal after servo-writing to prevent a track pitch variation are available (refer to, e.g., Patent Document 1: Japanese Patent No. 3336819).

However, there may be a case where a checksum is determined to be correct even when a correction value has improperly been read out. If the improper correction value is used, control processing according to erroneous position information is performed and, in the worst case, data to be written in a given track is written in the area so close to an adjacent track with the result that data in the adjacent track cannot be read out.

If correction values are stored in an ROM (Read Only Memory) or the like, it is possible to avoid the above problem. However, this configuration requires a corresponding memory capacity, resulting in an increase in cost. Thus, it is not possible to completely avoid the erroneous detection of a checksum as long as the correction values are stored in a recording medium.

SUMMARY OF THE INVENTION

The present invention has been made to solve the above problem, and an object there of is to provide a control apparatus, a storage apparatus, and a head control method capable of preventing a use of a correction value that has improperly been read out.

To solve the above problem, according to a first aspect of the present invention, there is provided a control apparatus that uses a correction value for head position written in a recording medium to control head position, comprising: an allowable range acquisition section that acquires a correction value allowable range which is a previously set allowable range of a correction value; and a head position control section that controls head position using a read out correction value in the case where the correction value that has been read out from the recording medium falls within the correction value allowable range acquired by the allowable range acquisition section.

In the control apparatus according to the present invention, in the case where a correction value that has been read out from the storage medium falls outside the correction value allowable range acquired by the allowable range acquisition section, the head position control section controls head position without using the read out correction value.

In the control apparatus according to the present invention, in the case where a correction value that has been read out from the storage medium falls outside the correction value allowable range acquired by the allowable range acquisition section, the head position control section controls head position without using the read out correction value and inhibits data writing operation at the set head position.

In the control apparatus according to the present invention, the head position is a position in the radial direction of the storage medium, and the correction value is a correction value in the radial direction which is included in a servo frame.

In the control apparatus according to the present invention, the correction value allowable range is previously set as the maximum and minimum values of a correction value which is measured for each predetermined area on the storage medium, and the allowable range acquisition section acquires the maximum and minimum values of a correction value in a predetermined area including head position set as a control target.

In the control apparatus according to the present invention, the allowable range acquisition section acquires a sync signal timing allowable range which is a previously set allowable range of the timing of a sync signal, and in the case where a correction value that has been read out from the storage medium falls inside the correction value allowable range acquired by the allowable range acquisition section and where the timing of a sync signal that has been read out from the recording medium falls within the sync signal timing allowable range acquired by the allowable range acquisition section, the head position control section controls head position using the read out correction value.

In the control apparatus according to the present invention, in the case where a correction value that has been read out from the storage medium falls outside the correction value allowable range acquired by the allowable range acquisition section or where the timing of a sync signal that has been read out from the recording medium falls outside the sync signal timing allowable range acquired by the allowable range acquisition section, the head position control section controls head position without using the read out correction value and inhibits data writing operation at the set head position.

In the control apparatus according to the present invention, the sync signal timing allowable range is previously set as the maximum and minimum values of a time difference between timing of two sync signals in a servo frame, the time difference being measured for each predetermined area on the storage medium, and the allowable range acquisition section acquires the maximum and minimum values of a time difference in a predetermined area including head position set as a control target.

In the control apparatus according to the present invention, the read out correction value is a correction value that the head position control section has read out one round before head position set as a control target.

According to a second aspect of the present invention, there is provided a storage apparatus that uses a correction value for head position written in a recording medium to control head position, comprising: an allowable range acquisition section that acquires a correction value allowable range which is a previously set allowable range of a correction value; and a head position control section that controls head position using a read out correction value in the case where the correction value that has been read out from the recording medium falls within the correction value allowable range acquired by the allowable range acquisition section.

According to a third aspect of the present invention, there is provided a head control method that uses a correction value for head position written in a recording medium to control head position, comprising: an allowable range acquisition step that acquires a correction value allowable range which is a previously set allowable range of a correction value; and a head position control step that controls head position using a read out correction value in the case where the correction value that has been read out from the recording medium falls within the correction value allowable range acquired by the allowable range acquisition step.

According to the present invention, it is possible to prevent a use of a correction value that has improperly been read.

DETAILED DESCRIPTION OF THE PREFERRED EMBODIMENTS

An embodiment of the present invention will be described below with reference to the accompanying drawings.

In the present embodiment, a disk apparatus provided with a control apparatus according to the present invention will be described.

Firstly, a configuration of the disk apparatus according to the present embodiment will be described.

Figure 1:
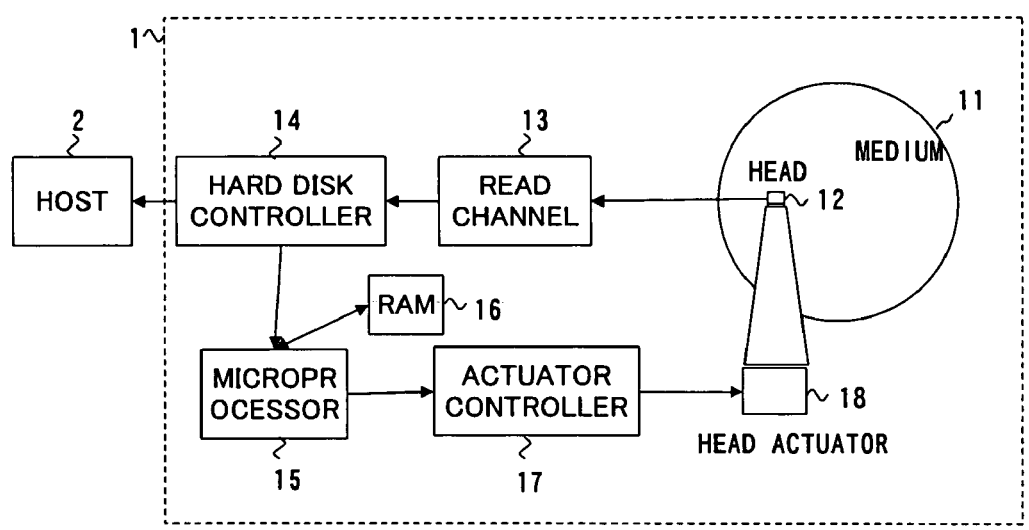
FIG. 1 is a block diagram showing a configuration example of a disk apparatus according to an embodiment of the present invention.

FIG. 1 is a block diagram showing a configuration example of a disk apparatus according to an embodiment of the present invention. A disk apparatus 1 includes a medium (recording medium) 11, a head 12, a read channel 13, a hard disk controller 14, a microprocessor (controller) 15, an RAM (Random Access Memory) 16, an actuator controller 17, and a head actuator 18. The hard disk controller 14 is connected to a host 2.

The outline of operations of the respective sections will be described along with readout operation of the disk apparatus 1. The head 12 reads out an analog signal from the medium 11 and sends it to the read channel 13. The read channel 13 converts the analog signal into a digital signal and sends it to the hard disk controller 14. The hard disk controller 14 acquires servo information and data from the digital signal and sends them to the microprocessor 15. The microprocessor 15 sends an instruction (control current value) on the head position to the actuator controller 17 according to the servo information. Further, the hard disk controller 14 sends the data to the host 2. The actuator controller 17 supplies the control current to the head actuator 18 according to the instruction from the microprocessor 15. The head actuator 18 moves the head 12 according to the control current.

A servo frame in which servo information has been written will next be described.

Figure 2:
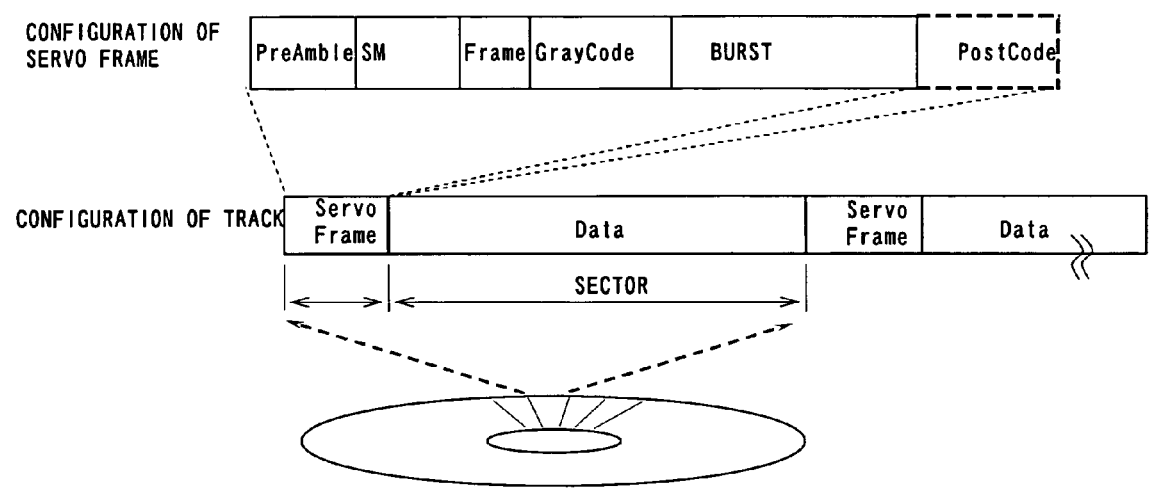
FIG. 2 is a block diagram showing a configuration example of a servo frame according to the present embodiment.

FIG. 2 is a block diagram showing a configuration example of the servo frame according to the present embodiment. As shown in FIG. 2, a servo frame position in which a servo frame is written exists before data field of each sector. About 100 servo frame positions exist in one track of the medium 11. The servo frame includes PreAmble, SM (SyncMark: signal for synchronization), frame identifier (Frame), GrayCode, burst, and PostCode. PreAmble is a waveform for drawing a phase. SM is a specific pattern. SM is included also in PostCode. SM in PostCode is a waveform in which the amplitude is set to 0. The detection timing of SM is used for correction of the circumferential position information. It is assumed here that SM after PreAmble is first SM and SM during PostCode processing is second SM. Frame identifier is used for identification of a servo frame. GrayCode, burst, and PostCode represent the servo frame position in the disk radial direction of the medium 11. More specifically, GrayCode represents rough radial position information. Burst represents detailed radial position information. PostCode represents a correction value of the radial position information.

In order to avoid data to be written in a given track from being written in the area so close to an adjacent track or avoid a PostCode of a track adjacent to a target track from being erroneously read out, a configuration is adopted in which when a PostCode is written in a given servo frame position number on a given track, a PostCode is not written in the same servo frame position number on adjacent tracks. For example, on a track whose track number is even, PostCodes are written only in servo frame positions whose servo frame position numbers are even; whereas on a track whose track number is odd, PostCodes are written only in servo frame positions whose servo frame position numbers are odd. Therefore, in a given target servo frame position, not only PostCode corresponding to the target servo frame position, but also PostCode corresponding the subsequent two servo frame positions are written.

Figure 3:
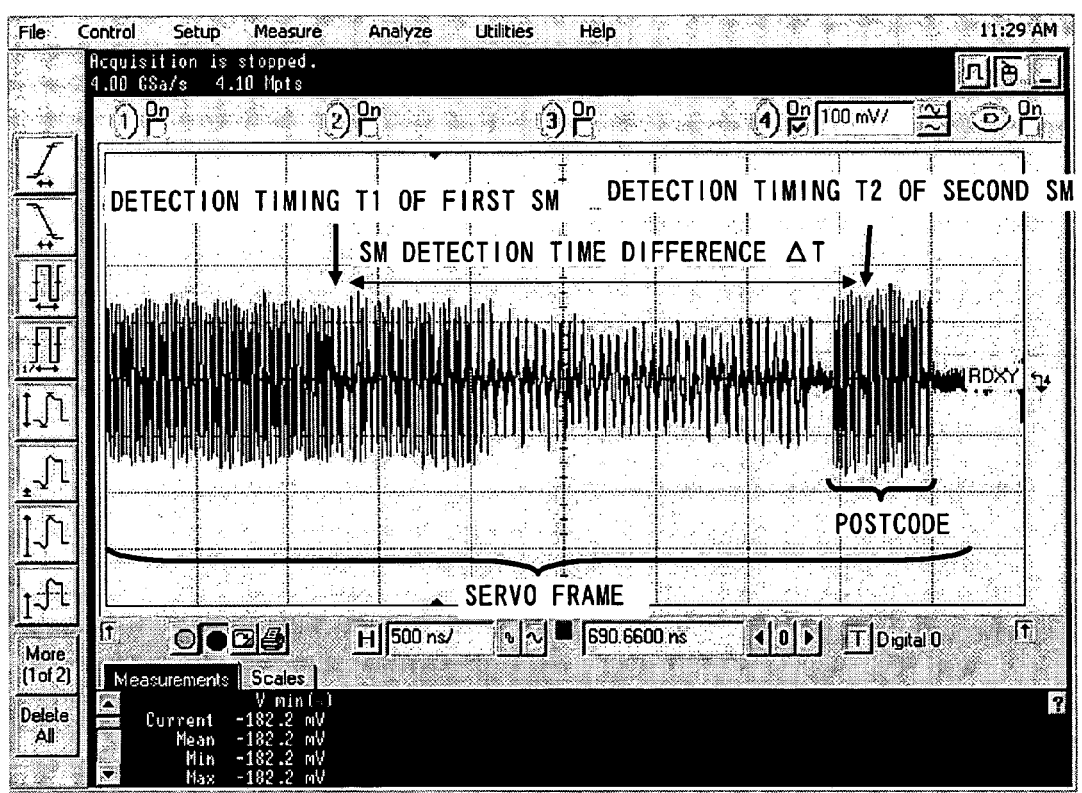
FIG. 3 is a waveform showing an example of the result of readout operation of a servo frame according to the present embodiment.
Figure 4:
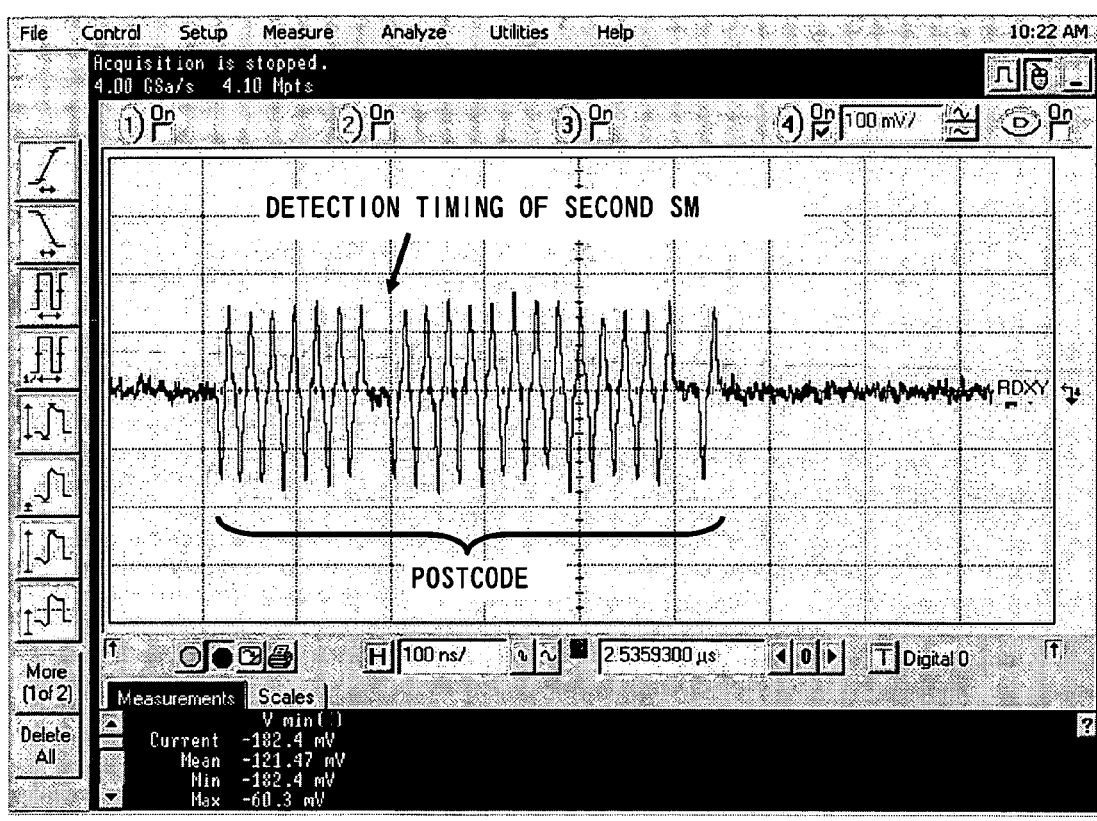
FIG. 4 is a waveform showing an example of the result of readout operation of PostCode according to the present embodiment.

FIG. 3 is a waveform showing an example of the result of readout operation of a servo frame according to the present embodiment. The waveform in FIG. 3 represents PostCode position, detection timing t1 of first SM, detection timing t2 of second SM, and position of SM detection time difference $\Delta t = t2 - t1$. FIG. 4 is a waveform showing an example of the result of readout operation of PostCode according to the present embodiment. FIG. 4 is an enlarged view of the portion of PostCode in FIG. 3 and represents detection timing t2 of second SM.

A description will next be given of PostCode writing processing that the microprocessor 15 performs according to a control program (firmware program). The PostCode writing processing is performed after servo-track write before use (before shipment) of the disk apparatus 1.

Figure 5:
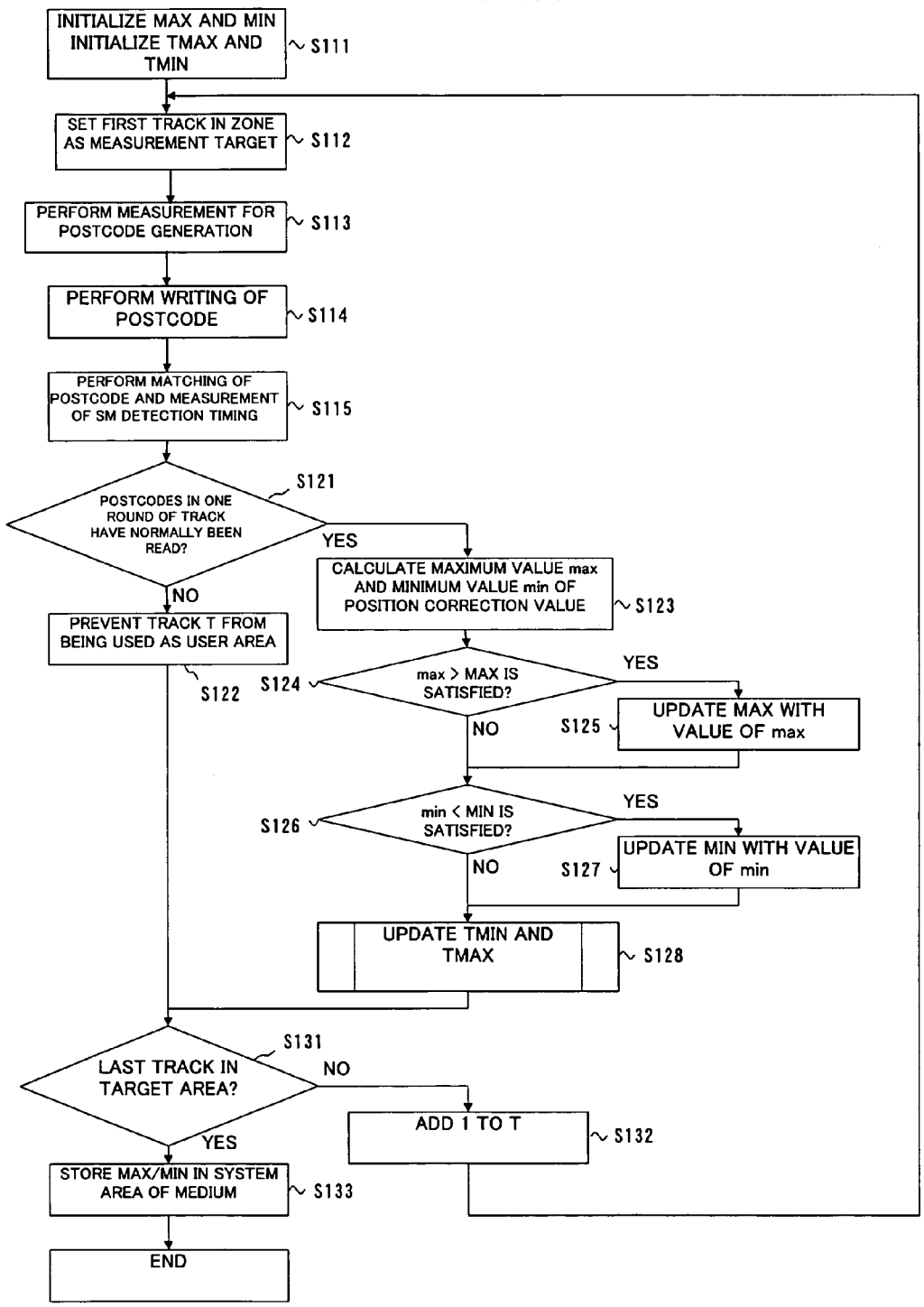
FIG. 5 is a flowchart showing an example of PostCode writing processing according to the present embodiment.

The target of the PostCode writing is called "zone" (predetermined area), and the PostCode writing processing is performed in units of zone. Zone is a set of some tracks. FIG. 5 is a flowchart showing an example of the PostCode writing processing according to the present embodiment. The microprocessor 15 initializes variables MAX and MIN (correction value allowable range) that respectively store the maximum and minimum values of a correction value acquired from PostCode and further initializes variables TMAX and TMIN (sync signal timing allowable range) that respectively store the maximum and minimum values of an SM detection time difference (S111). The SM detection time difference $\Delta t$ is calculated from Δt=T2−T1 where T1 is measured detection timing of first SM and T2 is measured detection timing of second SM.

The microprocessor 15 then sets a first track in a given zone as a measurement target and stores a first track number of the zone in a measurement target track number T (S112). The microprocessor 15 performs measurement for PostCode generation of the track T to calculate a correction value to be written in PostCode (S113). In the measurement for PostCode generation, the microprocessor 15 performs radial positioning control, applies DFT (Discrete Fourier Transform), inverse sensitivity function, and IDFT (Inverse DFT) to the position obtained as a result of the radial positioning control to calculate an error of the position, and sets the calculated error as a correction value. The microprocessor 15 then performs writing of PostCode of the track T (S114). After that, the microprocessor 15 reads out PostCode of track T to perform matching between written PostCode and readout PostCode and, at the same time, measures detection timing T1 of first SM, detection timing T2 of second SM, and SM detection time difference Δt (S115).

The microprocessor 15 then determines whether all PostCodes in one round of the track T have normally been read (S121). If any PostCodes have not normally been read (N in S121), the microprocessor 15 makes a setting for a system area or a memory such as an ROM to prevent the track T from being used as a user area (S122), and the flow shifts to step S131. If all PostCodes have normally been read (Y in S121), the microprocessor 15 calculates the maximum value max and minimum value min of all the correction values that have been read out from the track T (S123).

The microprocessor 15 then determines whether max>MAX is satisfied (S124). If max>MAX is not satisfied (N in S124), the flow shifts to step S126. If max>MAX is satisfied (Y in S124), the microprocessor 15 updates MAX with the value of max (S125). After that, the microprocessor 15 determines whether min<MIN is satisfied (S126). If min<MIN is not satisfied (N in S126), the flow shifts to step S128. If min<MIN is satisfied (Y in S126), the microprocessor 15 updates MIN with the value of min (S127). Then, the microprocessor 15 updates TMIN and TMAX (S128). That is, TMAX is updated with the maximum value of the SM detection timing, if it is greater than TMAX, and TMIN is updated with the minimum value of the SM detection timing, if it is smaller than TMIN.

The microprocessor 15 then determines whether the track T is the last track in the target area (S131). If the track T is not the last track (N in S131), the microprocessor 15 adds 1 to T (S132) and the flow returns to step S112. If the track T is the last track (Y in S131), the microprocessor 15 stores MAX, MIN, TMAX, and TMIN in the system area of the medium 11 (S133), and this flow is ended. MAX, MIN, TMAX, and TWIN may be stored in a non-volatile storage memory such as a flash ROM.

A description will next be given of preparation processing for use of PostCode that the microprocessor 15 performs according to a control program (firmware program). The preparation processing is performed during disk seek time in the use environment (normal operation environment after shipment) of the disk apparatus 1.

Figure 6:
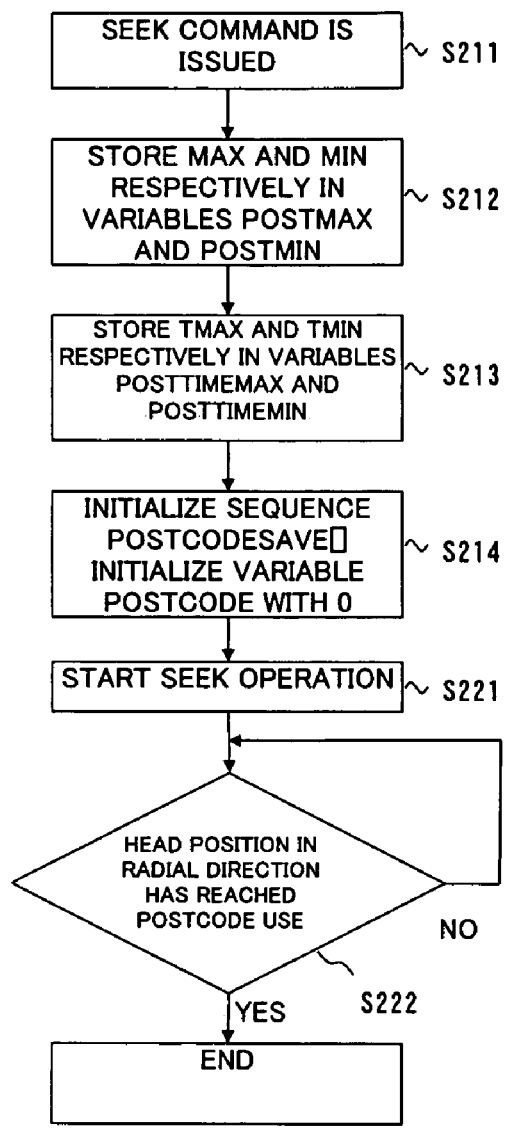
FIG. 6 is a flowchart showing an example of preparation processing for use of PostCode according to the present embodiment.

FIG. 6 is a flowchart showing an example of the preparation processing for use of PostCode according to the present embodiment. When a seek command for moving the head 12 to a given track is issued (S211), the microprocessor 15 starts this flow. Then, the microprocessor 15 acquires MAX and MIN of a zone corresponding to a target track indicated by the seek command and stores MAX and MIN respectively in variables PostMax and PostMin (S212). After that, the microprocessor 15 acquires TMAX and TMIN of a zone corresponding to a target track indicated by the seek command and stores TMAX and TMIN respectively in variables PostTimeMax and PostTimeMin (S213).

The microprocessor 15 then initializes values of sequence PostCodeSave☐ and variable PostCode (S214). Sequence PostCodeSave☐ has an element corresponding to each servo frame position. Each element is a correction value that can normally be readout in the last round. The default value of each element is set to −80 h which indicates that correction value is not normally been read. Variable PostCode is a variable that stores a correction value for use in an actual control. The default value of variable PostCode is set to 0 which indicates that a correction is not performed.

The microprocessor 15 then actually starts seek operation (S221). After that, the microprocessor 15 determines whether the head position in the disk radial direction has reached a PostCode use permit slice (S222). If the head position has not reached a PostCode use permit slice (N in S222), the floe returns to step S222. If the head position has reached a PostCode use permit slice (Y in S222), this flow is ended. The PostCode use permit slice is an area of the head position in the disk radial direction. If the head exists in this area, correction can be performed using a correction value. Subsequently, PostCode use processing to be described later is performed for read out PostCode.

Abovementioned variables PostMax, PostMin, PostTimeMax, PostTimeMin, PostCode, and sequence PostCodeSave☐ are stored in the RAM 16.

A description will next be given of PostCode use processing that the microprocessor 15 performs as a servo interrupt task using PostCode in the use environment of the disk apparatus 1.

Figure 7:
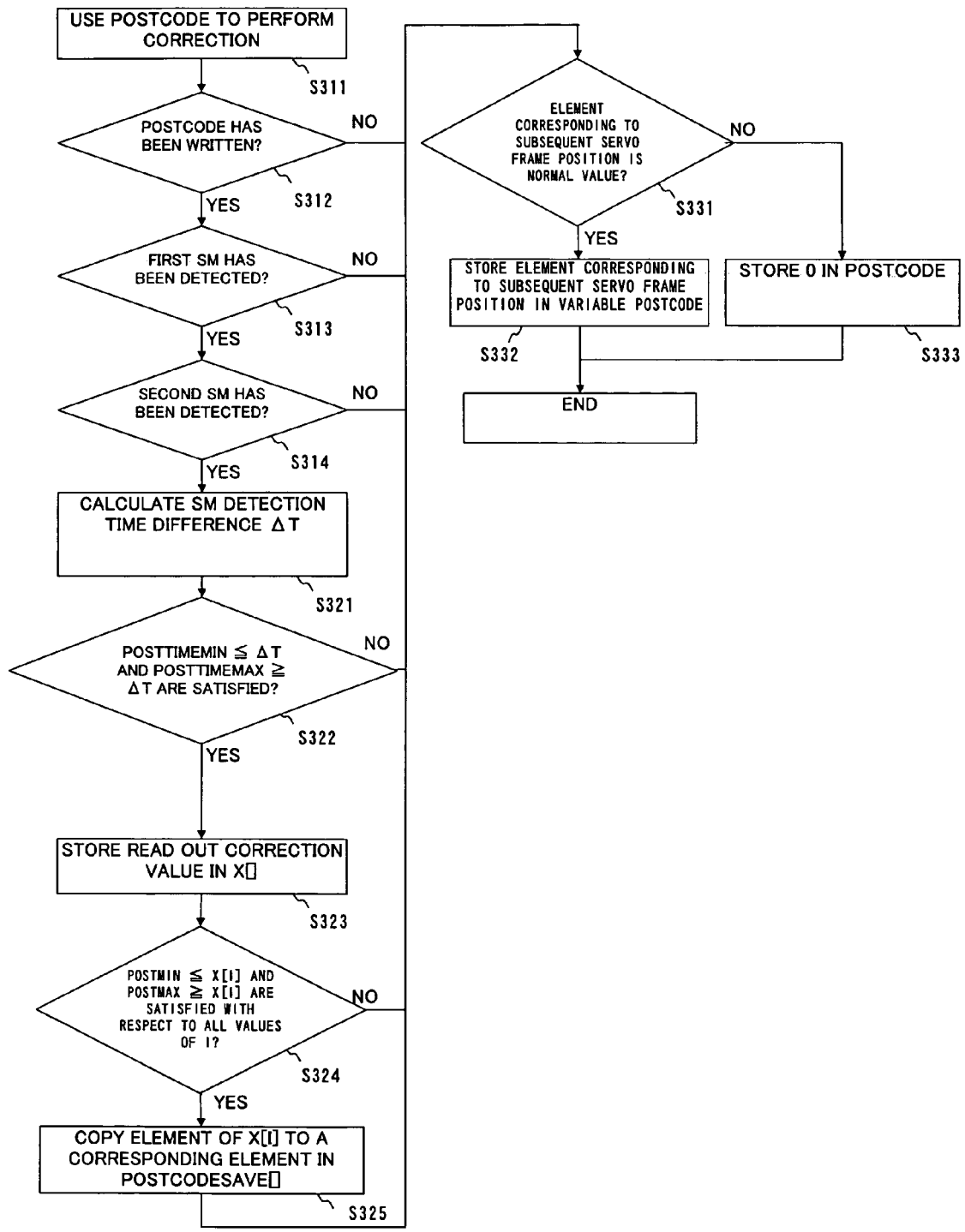
FIG. 7 is a flowchart showing an example of the PostCode use processing according to the present embodiment.

The PostCode use processing is performed in units of servo frame position. The servo frame read out in this processing is hereinafter referred to as current servo frame. FIG. 7 is a flowchart showing an example of the PostCode use processing according to the present embodiment. The microprocessor 15 uses a correction value stored in variable PostCode to correct position information to calculate a control current value to be supplied to the actuator controller 17 (S311). The correction value stored in variable PostCode is a value stored in the element corresponding to sequence PostCodeSave☐ by the PostCode use processing of the last round and a value stored in variable Postcode by the PostCode use processing applied to the preceding servo frame position.

The microprocessor 15 then determines whether PostCode has been written in the current servo frame position (S312). If PostCode has not been written (N in S312) in the current frame servo position, the flow shifts to step S331. If PostCode has been written in the current servo position (Y in S312), the microprocessor 15 determines whether first SM has been detected (S313). If first SM has not been detected (N in S313), the flow shifts to step S331. If first SM has been detected (Y in S313), the microprocessor 15 determines whether second SM has been detected (S314). If second SM has not been detected (N in S314), the flow shifts to step S331. If second SM has been detected (Y in S314), the microprocessor 15 calculates SM detection time difference Δt from detection timing t1 of first SM and detection timing t2 of second SM (Δt=t2−t1) (S321).

The microprocessor 15 then determines whether the condition of Δt, i.e., PostTimeMin≦Δt and PostTimeMax≧Δt is satisfied (S322). If Δt does not satisfy the condition (N in S322), the flow shifts to step S331. If Δt satisfies the condition (Y in S332), the microprocessor 15 stores a read out correction value in sequence x☐ (S323).

x☐ has an element corresponding to each servo frame position. Each element is a correction value that has been read out. As described above, information including a plurality of servo frame positions is written in one servo frame in order to avoid a servo frame of a track adjacent to a target track from being erroneously read out. In this case, in step S323, the microprocessor 15 separates correction values that have been collectively read out from one another in terms of the servo frame position and stores them in x☐ as an element corresponding to each servo frame position.

The microprocessor 15 then determines whether the condition of x[i] (i is servo frame position number), i.e., PostMin≦x[i] and PostMax≧x[i] is satisfied with respect to all values of i (S324). If any value of x[i] does not satisfy the condition (N in S324), the flow shifts to step S331. If all values of x[i] satisfy the condition (Y in S324), the microprocessor 15 determines that PostCode has normally been read out and copies all values of sequence x☐ to the positions corresponding to sequence PostCodeSave☐ (S325).

The microprocessor 15 then determines whether a value of element corresponding to the subsequent servo frame position in PostCodeSave☐ is a correction value that has normally been read out (S331). In this case, if a value of an element corresponding to the subsequent servo frame position is a value other than the abovementioned −80 h, the microprocessor 15 determines that the value is a correction value that has normally been read out. If a value of element corresponding to the subsequent servo frame position is a correction value that has normally been read out (Y in S331), the microprocessor 15 stores a value of an element of PostCodeSave☐ corresponding to the subsequent servo frame position in Variable PostCode (S332), and this flow is ended. If a value of element corresponding to the subsequent servo frame position is not a correction value that has normally been read out (N in S331), the microprocessor 15 stores 0 in PostCode and performs write inhibit processing in the subsequent servo frame position (S333), and this flow is ended. In the write inhibit processing, the microprocessor 15 sets PostCode to 0 to prevent correction from being performed in the subsequent servo frame position to thereby prevent data to be written in a given track from being written in the area so close to an adjacent track.

The abovementioned variables t1, t2, Δt, i, sequences x☐ and PostCodeSave☐ are stored in the RAM 16.

The above comparison step with respect to TMAX and TMIN may be omitted. In this case, only the comparison step with respect to MAX and MIN is performed.

According to the abovementioned PostCode use processing, when a correction value that has been determined to be a normal value in the last round is stored in the RAM 16, it is only necessary to perform control using the correction value in the RAM 16. When a correction value of the last round is not stored in the RAM 16, a correction value is not used but a setting to inhibit writing of data is made for a register in the hard disk controller 14. This setting inhibits writing operation of data into a medium, thereby preventing data to be written in a given track from being written in the area so close to an adjacent track.

After the write inhibit setting has been made, the microprocessor 15 performs retry as internal processing of the disk apparatus 1 to access a target track for additional recording operation. If an error occurs nevertheless, the microprocessor 15 sends an error report to the host.

The control apparatus according to the present embodiment can easily be applied to a storage apparatus to thereby further increase performance thereof. Examples of the storage apparatus mentioned here include a hard disk drive, a storage system. Further, the control apparatus according to the present embodiment can also be applied to recording media having shapes other than a disk shape and a storage apparatus adopting the non-disk-shaped recording medium.

Further, it is possible to provide a program that allows a computer constituting the control apparatus to execute the above steps as a control program. By storing the above program in a computer-readable storage medium, it is possible to allow the computer constituting the control apparatus to execute the program. The computer-readable medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; another computer and database thereof; and a transmission medium on a network line.

An allowable range acquisition section corresponds to the preparation processing for use of PostCode that the microprocessor performs in the embodiment. A head position control section corresponds to PostCode use processing that the microprocessor performs in the embodiment.

What is claimed is:

1. A control apparatus that uses a correction value for head position written in a recording medium to control head position, comprising:
    an allowable range acquisition section that acquires a correction value allowable range which is a previously set allowable range of a correction value; and
    a head position control section that controls head position using a read out correction value in the case where the correction value that has been read out from the recording medium falls within the correction value allowable range acquired by the allowable range acquisition section;
    wherein in the case where a correction value that has been read out from the storage medium falls outside the correction value allowable range acquired by the allowable range acquisition section, the head position control section controls head position without using the read out correction value.

2. The control apparatus according to claim 1, wherein the head position is a position in the radial direction of the storage medium, and
    the correction value is a correction value in the radial direction which is included in a servo frame.

3. The control apparatus according to claim 1, wherein the correction value allowable range is previously set as the maximum and minimum values of a correction value which is measured for each predetermined area on the storage medium, and
    the allowable range acquisition section acquires the maximum and minimum values of a correction value in a predetermined area including head position as a control target.

4. The control apparatus according to claim 1, wherein the read out correction value is a correction value that the head position control section has read out one round before head position set as a control target.

5. A control apparatus that uses a correction value for head position written in a recording medium to control head position, comprising:
    an allowable range acquisition section that acquires a correction value allowable range which is a previously set allowable range of a correction value; and a head position control section that controls head position using a read out correction value in the case where the correction value that has been read out from the recording medium falls within the correction value allowable range acquired by the allowable range acquisition section;

wherein in the case where a correction value that has been read out from the storage medium falls outside the correction value allowable range acquired by the allowable range acquisition section, the head position control section controls head position without using the read out correction value and inhibits data writing operation at the set head position.

6. A control apparatus that uses a correction value for head position written in a recording medium to control head position, comprising:

an allowable range acquisition section that acquires a correction value allowable range which is a previously set allowable range of a correction value; and a head position control section that controls head position using a read out correction value in the case where the correction value that has been read out from the recording medium falls within the correction value allowable range acquired by the allowable range acquisition section;

wherein the allowable range acquisition section acquires a sync signal timing allowable range which is a previously set allowable range of the timing of a sync signal, and in the case where a correction value that has been read out from the storage medium falls inside the correction value allowable range acquired by the allowable range acquisition section and where the timing of a sync signal that has been read out from the recording medium falls within the sync signal timing allowable range acquired by the allowable range acquisition section, the head position control section controls head position using the read out correction value.

7. The control apparatus according to claim 6, wherein in the case where a correction value that has been read out from the storage medium falls outside the correction value allowable range acquired by the allowable range acquisition section or where the timing of a sync signal that has been read out from the recording medium falls outside the sync signal timing allowable range acquired by the allowable range acquisition section, the head position control section controls head position without using the read out correction value and inhibits data writing operation at the set head position.

8. The control apparatus according to claim 6, wherein the sync signal timing allowable range is previously set as the maximum and minimum values of a time difference between timing of two sync signals in a servo frame, the time difference being measured for each predetermined area on the storage medium, and the allowable range acquisition section acquires the maximum and minimum values of a time difference in a predetermined area including head position as a control target.

9. A storage apparatus that uses a correction value for head position written in a recording medium to control head position, comprising:

an allowable range acquisition section that acquires a correction value allowable range which is a previously set allowable range of a correction value; and a head position control section that controls head position using a read out correction value in the case where the correction value that has been read out from the recording medium falls within the correction value allowable range acquired by the allowable range acquisition section;

wherein in the case where a correction value that has been read out from the storage medium falls outside the correction value allowable range acquired by the allowable range acquisition section, the head position control section controls head position without using the read out correction value.

10. The storage apparatus according to claim 9, wherein the head position is a position in the radial direction of the storage medium, and the correction value is a correction value in the radial direction which is included in a servo frame.

11. The storage apparatus according to claim 9, wherein the correction value allowable range is previously set as the maximum and minimum values of a correction value which is measured for each predetermined area on the storage medium, and the allowable range acquisition section acquires the maximum and minimum values of a correction value in a predetermined area including head position set as a control target.

12. The storage apparatus according to claim 9, wherein the read out correction value is a correction value that the head position control section has read out one round before head position set as a control target.

13. A storage apparatus that uses a correction value for head position written in a recording medium to control head position, comprising:

an allowable range acquisition section that acquires a correction value allowable range which is a previously set allowable range of a correction value; and a head position control section that controls head position using a read out correction value in the case where the correction value that has been read out from the recording medium falls within the correction value allowable range acquired by the allowable range acquisition section;

wherein in the case where a correction value that has been read out from the storage medium falls outside the correction value allowable range acquired by the allowable range acquisition section, the head position control section controls head position without using the read out correction value and inhibits data writing operation at the set head position.

14. A storage apparatus that uses a correction value for head position written in a recording medium to control head position, comprising:

an allowable range acquisition section that acquires a correction value allowable range which is a previously set allowable range of a correction value; and a head position control section that controls head position using a read out correction value in the case where the correction value that has been read out from the recording medium falls within the correction value allowable range acquired by the allowable range acquisition section;

wherein the allowable range acquisition section acquires a sync signal timing allowable range which is a previously set allowable range of the timing of a sync signal, and in the case where a correction value that has been read out from the storage medium falls inside the correction value allowable range acquired by the allowable range acquisition section and where the timing of a sync signal that has been read out from the recording medium falls within the sync signal timing allowable range acquired by the allowable range acquisition section, the head position control section controls head position using the read out correction value.

15. The storage apparatus according to claim 14, wherein in the case where a correction value that has been read out from the storage medium falls outside the correction value allowable range acquired by the allowable range acquisition section or where the timing of a sync signal that has been read out from the recording medium falls outside the sync signal timing allowable range acquired by the allowable range acquisition section, the head position control section controls head position without using the read out correction value and inhibits data writing operation at the set head position.

16. The storage apparatus according to claim 14, wherein the sync signal timing allowable range is previously set as the maximum and minimum values of a time difference between timing of two sync signals in a servo frame, the time difference being measured for each predetermined area on the storage medium, and the allowable range acquisition section acquires the maximum and minimum values of a time difference in a predetermined area including head position set as a control target.

17. A head control method that uses a correction value for head position written in a recording medium to control head position, comprising:
   an allowable range acquisition step that acquires a correction value allowable range which is a previously set allowable range of a correction value; and
   a head position control step that controls head position using a read out correction value in the case where the correction value that has been read out from the recording medium falls within the correction value allowable range acquired by the allowable range acquisition step;
   wherein in the case where a correction value that has been read out from the storage medium falls outside the correction value allowable range acquired by the allowable range acquisition step, the head position control step controls head position without using the read out correction value.

* * * * *